United States Patent
Maximilien et al.

(10) Patent No.: US 8,856,882 B2
(45) Date of Patent: Oct. 7, 2014

(54) METHOD OF MANAGEMENT IN SECURITY EQUIPMENT AND SECURITY ENTITY

(75) Inventors: Benoît Maximilien, Le Chesnay (FR); Vladimir Ksinant, Rueil Malmaison (FR)

(73) Assignee: Thales, Neuilly sur Seine (FR)

( * ) Notice: Subject to any disclaimer, the term of this patent is extended or adjusted under 35 U.S.C. 154(b) by 577 days.

(21) Appl. No.: 12/919,744

(22) PCT Filed: Feb. 12, 2009

(86) PCT No.: PCT/EP2009/051643
§ 371 (c)(1), (2), (4) Date: Apr. 27, 2011

(87) PCT Pub. No.: WO2009/106432
PCT Pub. Date: Sep. 3, 2009

(65) Prior Publication Data
US 2011/0202975 A1    Aug. 18, 2011

(30) Foreign Application Priority Data

Feb. 26, 2008 (FR) ..................................... 08 01037

(51) Int. Cl.
*H04L 29/06* (2006.01)
(52) U.S. Cl.
CPC ........ *H04L 63/0209* (2013.01); *H04L 63/1408* (2013.01)
USPC .................................................. 726/4; 726/5
(58) Field of Classification Search
USPC ......................................... 726/4, 5; 709/200
See application file for complete search history.

(56) References Cited

U.S. PATENT DOCUMENTS

| 7,500,104 B2 * | 3/2009 | Goland ......................... 713/175 |
| 7,581,111 B2 * | 8/2009 | Wagner et al. ................. 713/182 |
| 2007/0055752 A1 * | 3/2007 | Wiegand et al. .............. 709/220 |
| 2007/0174381 A1 * | 7/2007 | Kitamura ...................... 709/200 |
| 2008/0120699 A1 * | 5/2008 | Spear .................................. 726/4 |
| 2008/0147868 A1 * | 6/2008 | Dawidowsky et al. ....... 709/227 |

FOREIGN PATENT DOCUMENTS

| WO | WO 00/78004 | 12/2000 |
| WO | WO 2007/069245 | 6/2007 |

OTHER PUBLICATIONS

Search Report, mailed on Aug. 14, 2009, for PCT/EP2009/051643, filed on Feb. 12, 2009.

* cited by examiner

*Primary Examiner* — Brandon Hoffman
*Assistant Examiner* — Thong Truong
(74) *Attorney, Agent, or Firm* — Stroock & Stroock & Lavan LLP (57) ABSTRACT

Method of managing security entities positioned to cut off an information stream within a network. The method includes designating an entity to act as a sponsor for a new ward wishing to join the network, requesting to connect the ward with the sponsor, said sponsor determining whether or not it accepts the connection. If the sponsor accepts the connection, then connecting the sponsor and disconnecting from the plurality of entities forming the network. At least one of the entities and the sponsor checking a security level of said ward. If at least one of the entities decides to trust said ward, then the sponsor transmits to the ward configuration information to enable the ward to enter into communication with the network. If at least one of the entities decides not to trust the ward, then the ward cannot access the network and an alarm is generated.

10 Claims, 6 Drawing Sheets

METHOD OF MANAGEMENT IN SECURITY EQUIPMENT AND SECURITY ENTITY

CROSS-REFERENCE TO PRIOR APPLICATIONS

This application is the U.S. National Phase Application under 35 U.S.C. §371 of International Application No. PCT/EP2009/051643, filed on Feb. 12, 2009, and claims the benefit of French Patent Application No. 0801037, filed on Feb. 26, 2008, both of which are incorporated by reference herein. The International Application was published on Sep. 3, 2009 as WO 2009/106432.

FIELD

The invention relates to a method and system used in the field of information systems security. It applies, for example, to the field of management of security equipment positioned to cut off the information stream within a network.

BACKGROUND

Currently, to ensure security in data or information interchanges between elements within a network, specific management and security centers are typically used. This generates a significant workload for the operators, such as the banks or any other operator working in the field of information systems security (ISS). This workload is all the greater when the number of elements to be managed is large. There is therefore a need to find a "transparent management" solution with which to rationalize the human resources and hardware means.

Various applications require a management center for:
the cryptographic equipment positioned in hardware cutoff configuration in a so-called sensitive network, such as the high bit rate encryptors, the security highway encryptors (in particular for the Ethernet), and individual encryptors,
the filtering equipment positioned in hardware cutoff configuration in a sensitive network, for example the firewalls,
the security software installed on the terminals and the servers handling the information: the software firewalls, the encryption software, the antivirus software, the user authentication software, and so on.

Hereinafter in the description, the abbreviation SE designates security entities that combine all the equipment and products cited above.

When it comes to security in the exchanging of information or data and for information systems, it is important to manage security entities. In practice, a certain number of services are needed to administer cryptographic equipment, whether civilian or defense-related. Although there is a specificity in sensitive networks, because of the protocols used, the particular protection measures, the algorithms used, or even desired level of security, the same type of management is often found:
management of the security policy: in other words, the establishment of the security associations or SA or even the constitution of communities or the creation of virtual private networks known by the abbreviation VPNs, which amounts to determining who can dialog with whom, how to manage the keys; this aspect can be called the "rights",
management of supervision, that is to say the reporting of information coming from the entities: alarms, events, connections or logs, the common information base or the management information base, known by the abbreviation MIB for the IP (Internet protocol) world, configuration management, management of technical facts, incidents, etc.; this aspect can be called "reporting",
administration of security products which ensures the integral nature of the network and of trust (guarantee provided by certificates, public key infrastructures, or "PKIs", directories, etc.); this aspect is called "authority".

Figure 1:
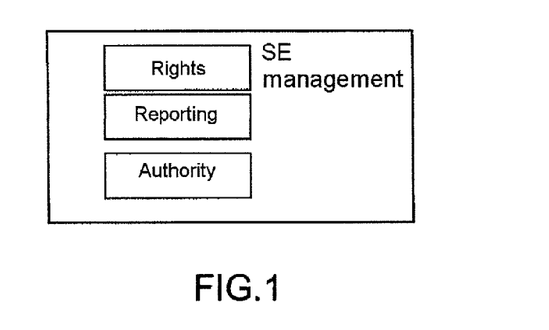

FIG. 1 diagrammatically represents the three abovementioned integrated blocks which, in the management module, constitute: rights, reporting and authority.

Figure 2:
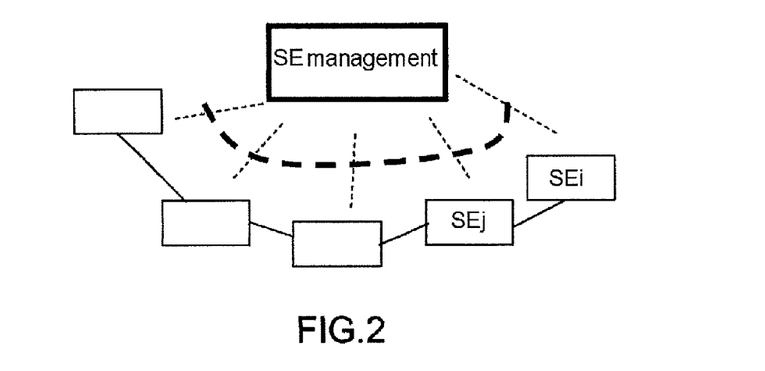

FIG. 2 is a diagram describing a central SE management unit linked with elements $SE_i$, $SE_j$, the various elements being able to communicate with one another.

One of the problems is that each element can have its own security policy and use elements that are proprietary in terms of interfaces, protocols, algorithms, usages and usage contexts. These specificities prevent or hinder the interworking between the elements and their shared working. As it happens, all the players in the abovementioned ISS domain are currently seeking to rationalize the human and hardware resources.

Moreover, the current centralized systems constitute a serious brake on the implementation of security functions in highly open-ended network environments such as ad hoc radio networks, that is to say networks in which the nodes and elements are mobile. Although the network problems are currently largely being resolved, the use of a centralized security management facility in such environments runs counter to the objectives of flexibility and decentralization.

The rest of the description uses names known to those skilled in the art to designate various elements used in the system and the method according to embodiments of the invention.

Thus, the term trust designates the determination by an SE of its future behavior with respect to another SE. This trust may be built on the basis of strong proofs like the existence of a secret shared between the SEs. This secret or these secrets may be keys, passwords, a cryptographic algorithm or any other confidential datum. In the absence of strong proof, the trust may also be based on:
the past behavior of the SEs concerned,
the degree of threat to which the SEs are subject.

A trusted platform, an expression known in the security field, is a hardware device, such as a processor, a programmable circuit of the FPGA (field programmable gate array) type, a custom integrated circuit, better known by the abbreviation "ASIC", and software trusted by the security experts, which means that they preferably have:
mastery of the components and of the electronic cards (printed circuits, routing), of the SE protection mechanisms (holographic labels, casing resistant to electromagnetic radiation),
the absence of back doors, which present the risk of allowing information considered sensitive to pass in clear, unencrypted, without passing through the encryption module,
mastery of the codes and absence of errors in the executive of programs, or "bugs" (coverage test, coding rule, code analysis).

Often, a trusted platform is positioned as a cutoff and not as a resource in order to guarantee a high security level and to be the obligatory passage for all the inter-domain messages, between the sensitive domain A and the non-sensitive free domain B.

The word "vote" relates to a dialog mechanism between entities in which an entity asks others for their recommendations in order to take a collective decision. The decision is then reported to all the entities concerned. The vote is therefore based on a question/answer/decision notification network mechanism known to those skilled in the art.

The word "sponsor" corresponds to the entity through which the membership of a new arrival (or ward) within a community is decided. The sponsor is also responsible for transmitting to the ward all of the configuration elements that will enable it to communicate within the community.

SUMMARY

An embodiment of the present invention provides entities that are capable of self-management among themselves without having to refer the management to a higher instance. This automatic management implies that there is trust in the information interchanges between the members of the network and that it is propagated dynamically and in a decentralized manner. The method and the system according to embodiments of the invention rely on the simultaneous implementation of certain rules: the monitoring of an entity by the other entities, the propagation of the information through the network formed by entities. For this, the system for example implements the following rules: rules for the adoption of an entity within a network including intercommunicating entities, rules for communication between these entities and rules for excluding or integrating an entity.

An embodiment of the invention relates to a method of managing software or hardware security entities SEi positioned to cut off the information stream within an existing network in which security entities SEi communicate with one another, including at least the following steps:
  designating an entity to act as the sponsor for a new entity or ward wishing to join the network,
  the ward contacts the sponsor and, on receipt of the request to connect the ward, the sponsor determines whether or not it accepts the connection,
  if the sponsor accepts the connection of the ward, then the sponsor connects to the ward and disconnects from the other SE equipment forming the network,
  at least one of the entities and/or the sponsor checks the security level of the ward,
    if the sponsor or at least one of the entities decides to trust the ward, then the sponsor transmits to the ward configuration information designed to enable it to enter into communication with the other entities of the network,
    if the sponsor or at least one of the entities decides not to trust the ward, then the latter cannot access the network and an alarm is generated to the other entities of the network.

The method includes a step for access from the ward to the network after the initialization step including the following steps: if the ward is accepted by the entities that it has contacted, the address books of the contacted entities are updated with the data of the ward, and the ward then freely communicates with the entities that it has contacted.

Each entity monitors, for example, the behavior of the entities that are contained in its address book by using established communication rules.

An entity detecting an operating anomaly or an abnormal behavior on the part of another entity notifies for example all the entities of the network of this anomaly.

All the alerted entities are then mutually informed of their respective recommendations concerning the exclusion decision and, depending on the nature of the messages received and according to an algorithm, the entities decide, by choice:
  to exclude the entity that has been denounced, the denounced entity being excluded from all the address books,
  to do nothing,
  to exclude the entity that has been denounced, the latter then being excluded from all the address books.

An embodiment of the invention also relates to a software or hardware security entity positioned to cut off the information streams within a network, including SE entities communicating with one another, including at least the following elements:
  a means for connecting an entity to an element to be protected, the means being designed to execute the steps of the abovementioned method,
  the means is linked to a multiplexer, which receives some of the commands from a control device making it possible to change the operating mode of the elements,
  the multiplexer has an input for the protected data originating from the input/output port, an input, for the data from the port used for the initialization phase, an input receiving the commands, an output, transmitting the data to a trusted platform,
  the trusted platform has an output which is connected to an output port toward an unprotected network.

The connection means includes, functionally (the means may be implemented either as hardware or as software):
  a standard input/output port connected to a network or a station or software to be protected,
  a contact or input port, the function of which is to enable the initialization phase implemented by the abovementioned method to be executed.

The connection means includes for example two software modules, one of the two modules being designed to execute the initialization phase implemented by the abovementioned method.

The trusted platform may include a random variable generation module and/or a storage module.

The connection means includes a software module designed to execute the initialization phase for a ward in a network by executing the steps of the abovementioned method and a software module designed to manage the inputs/outputs between an entity and a network.

BRIEF DESCRIPTION OF THE DRAWINGS

Other features and advantages of the device according to an embodiment of the invention will become more apparent from reading the following description of an exemplary embodiment given as a non-limiting illustrative example, with appended figures which represent:

FIGS. 1 and 2, operating diagrams of a system with centralized management according to the prior art, FIG. 3, a diagram of a decentralized management system according to an embodiment of the invention, FIG. 4, the steps implemented when initializing the system according to an embodiment of the invention, FIG. 5, the steps executed during the phase for access from an element to the system according to an embodiment of the invention, FIG. 6, an example of communication following the first system network access of a new entity according to an embodiment of the invention, FIG. 7, the flow diagram corresponding to the first network access phase according to an embodiment of the invention, FIG. 8, an exemplary flow diagram of reporting and communication for dynamically updating the address books of the various entities of a community according to an embodiment of the invention, FIG. 9, a detailed example of a structure of cryptographic equipment of high security level according to an embodiment of the invention, and FIG. 10, an exemplary implementation of the method according to an embodiment of the invention which shows the benefit of the method for multiple applications, in the case of small network topologies.

DETAILED DESCRIPTION

In order to better understand the decentralized management method and system according to an embodiment of the invention, the following example is given in the context of a network including entities.

Internal Structure of an SE

Figure 9:
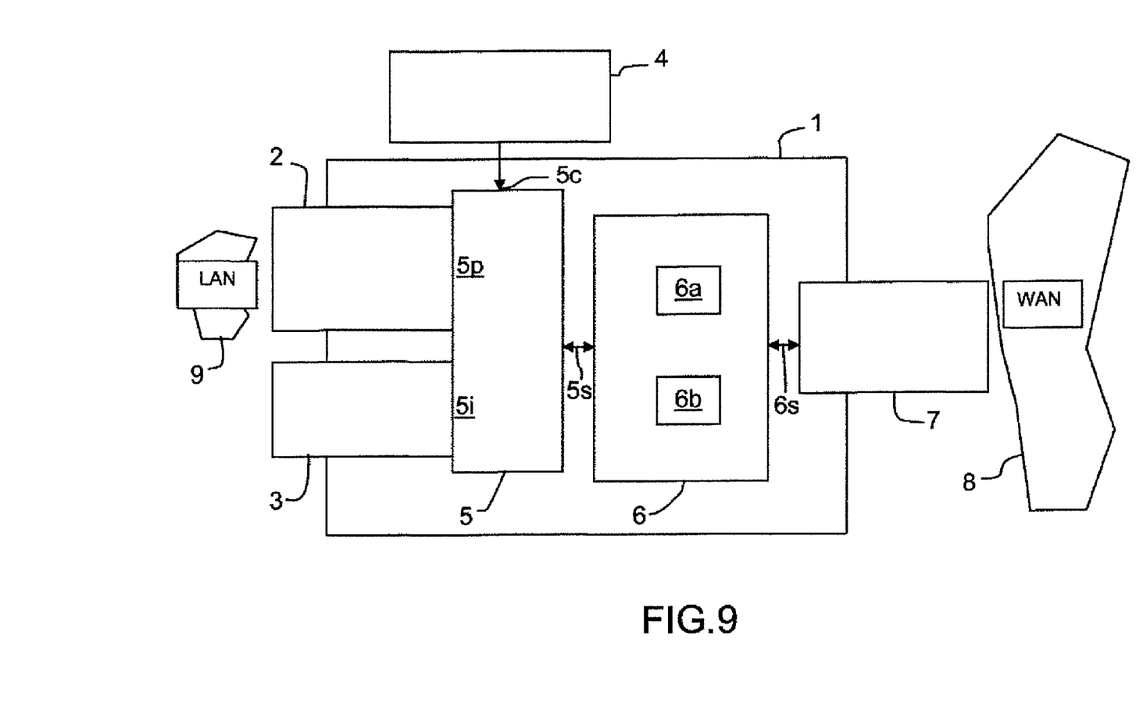

In this example, an entity SE can correspond to a cryptographic element 1 conforming to the detailed diagram of FIG. 9.

An aspect of an element 1 forming part of the system is to protect a private local area network (LAN) of a shared wide area network (WAN). The element 1 includes a standard input/output port 2 connected to the local area network and a port 3 dedicated to the initialization phase. These two ports may, depending on the embodiment, take different forms, which take into account the degree of security desired by a user. In the example explained as a nonlimiting example in order to better understand the operation and the specific features of the method according to an embodiment of the invention, the two ports are shown as physically separate elements each fulfilling a function. In other examples, the element will have a single physical pull supporting the data interchanges and the port will include at least one software module, the function of which is to execute the initialization phase of the method described hereinbelow and a software module dedicated to the management of the standard inputs/outputs between the SE element and the local area network.

A control device 4 is used to select the operating mode for the multiplexing between: the initialization mode (mode 1 using the port 3) and a communicating mode (mode 2 using the port 2).

The two ports 2 and 3 are linked to a multiplexer 5 (for example, an exclusive "OR" device) which receives commands from a control device 4. The function of this control device 4 manages the changing of operating mode of the elements. For example, the mode 1 relates to the network initialization phase when a new element wants to join the system including elements, the mode 2 relates to the network access phase, that is to say the phase which begins once the element is accepted by the other network elements.

The multiplexer 5 has an input-output 5p for the protected data originating from the input/output network port 2 (LAN side), an input/output 5i for the data from the port 3 used for the initialization phase (contact port dedicated to new entities, in other words, exclusive access to the wards), an input 5c receiving the commands, an input/output 5s transmitting the data to a trusted platform 6.

A trusted platform 6 is, in the context of an embodiment of the present invention, a device that includes a random variable generation means 6a and a module 6b for storing secret elements. The latter can be keys, network configuration parameters, community parameters or equipment parameters. The trusted platform 6 has an input/output 6s which is connected to a port 7 toward a wide area network known by the abbreviation WAN 8. The cryptographic element is positioned in cutoff configuration between the network to be protected 9 and the WAN network 8.

An Operational Network with ARD Management

Figure 3:
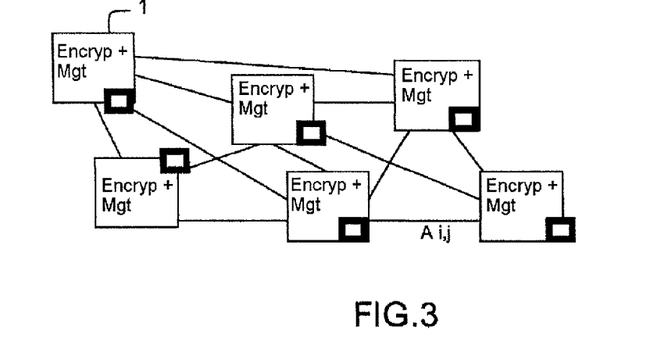

FIG. 3 diagrammatically represents a network including cryptographic elements SEi having an internal structure similar to that described in FIG. 9 communicating with one another via communication links Aij.

The method according to an embodiment of the invention executes various steps detailed hereinbelow, which includes:
- the entry of a new element in a network in the course of normal operation,
- the monitoring of the various entities present within the network, of the sponsor and of the ward or new arrival,
- warning in the event of malfunction of the entities,
- acceptance of the new arrival and everything devolving therefrom.

Arrival of a New SE in Two Steps:

First Step: Initialization

Figure 4:
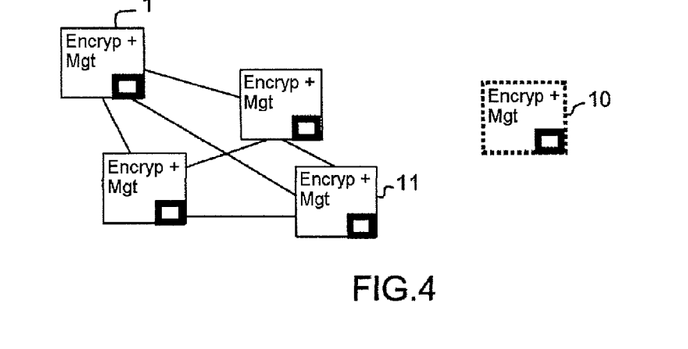

FIG. 4 represents the steps implemented during the initialization phase or first step for a new arrival wanting to connect to the network. This phase corresponds to an entry of a new element in the network, for example of FIG. 3, this network already being operational. A new element 10 wants to connect to the system including elements 5i that are already communicating with one another via communication highways Aij. For this, one of the elements 11 will act as sponsor. All the elements have the capability to become the sponsor for a new element. For this, the SE elements have, for example, software designed to execute the various steps of the method according to an embodiment of the invention, including the first initialization step and the second system access step for the new arrival.

The element 11 serving as sponsor will interrupt its dialog with the other elements SEi by virtue of the multiplexer 5 shown by its internal structure (see FIG. 9). This is the so-called initialization phase.

The element 10 that wants to connect to the network exchanges information with the sponsor element 11. The first connection of the new arrival 10 to the reserved input 5i or contact port of the sponsor 11 results in the disconnection of the other inputs/outputs of the sponsor element (FIG. 5), namely the ports 5p, 6s. This disconnection is represented in the figure by the letters Cij. This phase is considered to be highly sensitive and it may, in certain cases, correspond to the exchange of the first secrets between the sponsor 11 and the new arrival 10. The sponsor 11 will receive data from the new arrival 10 and check, for example, the configuration of the new arrival. This configuration includes, for example, the following elements:
- parameters associated with the network capabilities of the new arrival, such as, for example, the number of network interfaces, possible bit rate limitations, routing protocols supported,
- a list of the applications supported by the new arrival,
- parameters associated with the applications supported by the new arrival, for example, the voice coding types for a speech application, TCP or UDP ports used for the application,
- parameters associated with the security functions of the new arrival:
    - definition of the security policies supported,
    - the encryption algorithms supported and the size of the keys, of the playback prevention counters and the crypto-period.

For example, the sponsor checks whether the new arrival is compatible:

with the applications used in the system, with the security level targeted in the system.

The sponsor 11 can also check the history of the communications already made by the new arrival or ward 10, for example: with whom has the new arrival already communicated? Has it already been sponsored by other entities? Has it recently undergone configuration changes? These checks are carried out by means of software contained in the SE entities.

If the sponsor 11 decides to trust the ward 10, then the sponsor 11 transmits to the ward 10 information that will enable it to enter into communication with the rest of the system. Such information may be keys, a detailed definition of the security policies in force in the system, the address book, the community's security parameters, or any other element necessary to the communicating independence of the ward with the community.

In the case of the abovementioned cryptographic elements, each element is designed to generate a secret by virtue of the trust platform component 6 which contains the random variable generator 6a. In this model, for example, a cryptographic element is a trusted authority competent to create and distribute keys. Preferably, this phase includes a strong trust relationship between two elements. This phase includes the execution of a specific encryption algorithm and/or a strong authentication in order to use the SE in this specific mode: this may involve mechanisms such as passwords, CIK (crypto ignition key), a cryptographic interchange algorithm reserved for this interchange, and so on.

Arrival of a New Se in 2 Steps: Second Step: System Access

Figure 5:
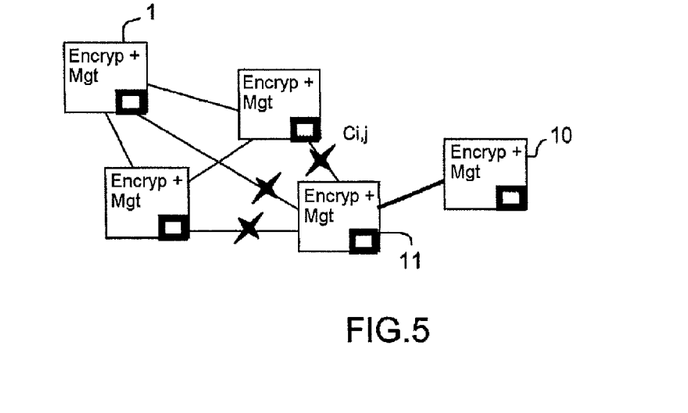
Figure 6:
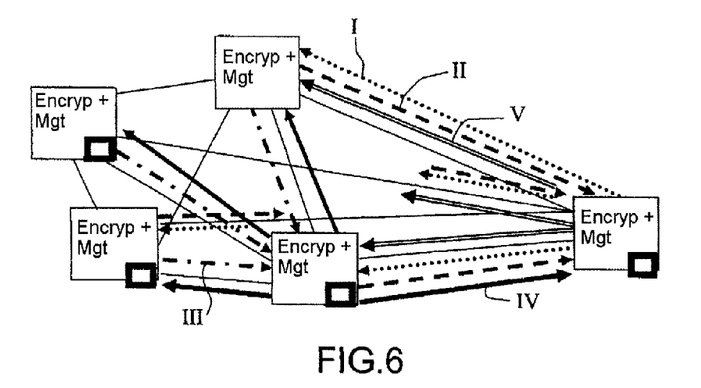

Then, after this initialization phase, the new element 10 is inserted into the system, which is the step described in FIGS. 5 and 6. This network insertion phase includes three steps, the procedure being given by way of indication because it depends on the desired security level:

1. Optionally, check by the ward on the validity of the sponsor step 1.1: this step is used to validate and measure the trust in the sponsor in the system (arrow I). The incoming SEs send a vote consultation to all the SEs of each community in the address book received from the sponsor (or possibly to a subset of the SEs listed in the address book received from the sponsor). This consultation is also sent to the sponsor. If a negative vote (arrow II) is obtained from the survey, then the newcomer sends an alarm to all the community. The process stops at this point, step 1.2.

2. If the sponsor is validated, the method tests the validity of the ward: this step 1.3 (optional) is used to validate and measure the trust in the ward (arrow III). All the elements that make up the network are consulted and notify the sponsor as to whether or not they validate the arrival of the newcomer. Depending on the nature of the messages received (for example, following a negative vote from the majority of the members of the community), the sponsor may decide to invalidate the entry of the newcomer, step 1.4. It then sends an alarm (step 1.5) to all the community or at least to the part of the community concerned (arrow IV). If there are no problems (step 1.6) then the sponsor sends an acknowledgement to the part of the community concerned to notify them of its decision. The ward is also notified and it can then (if necessary) send the part of the community concerned the information that will then enable them to communicate with one another, for example, new keys, new parameters, etc. (arrow V).

3. An alarm processing function may be put in place according to two scenarios:
    either the alarm is not sent to all of the community because all the SE elements that have been surveyed have answered (SE "active" state) or else have disconnected after warning (SE element "inactive" state): see reporting rules.
    or the alarm is generated and sent to all the community because there is indeed a problem (an SE that has been surveyed has been disconnected without warning the community, or else the sponsor or the ward is not trusted).

The ward SE 11 is fully accommodated in the system. The relevant members of the community add it to their respective address books.

Example of a Process for Network Access from a New SE (Flow Diagram)

Figure 7:
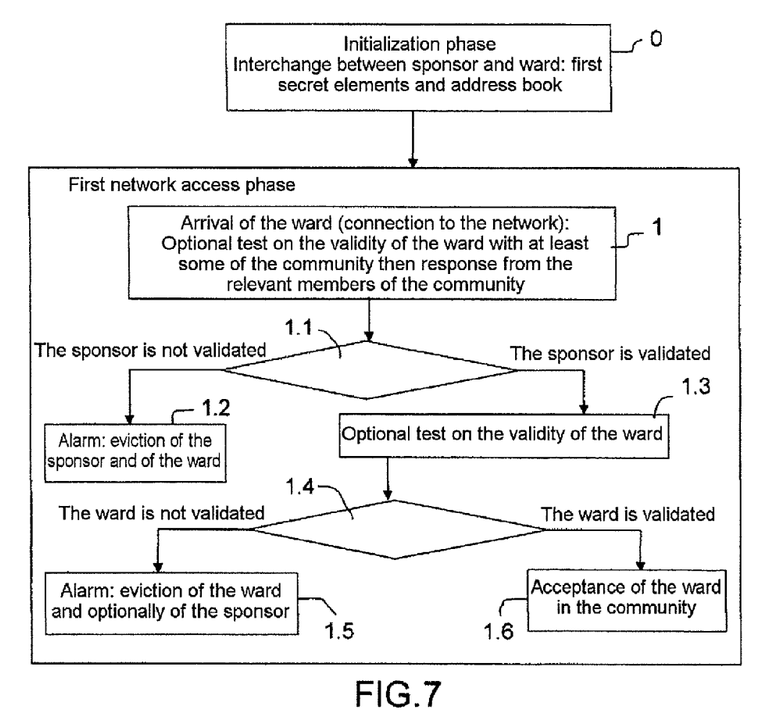

FIG. 7 represents the flow diagram showing the abovementioned steps, which summarizes the rule governing the adoption of a new element in a network.

Once incorporated in its community, that is to say, the set of cryptographic elements initially forming a network, the ward equipment becomes independent.

The steps that are executed according to the method are as follows:

Step 0: initialization phase which implements an interchange between the sponsor and the ward: for example, an exchange of the first secret elements and of the address book, Step 1: arrival of the ward which corresponds to connection to the network. It implements an optional test on the validity of the sponsor with at least a part of the community, then it includes the response from the relevant members of the community;

Step 1.1: is the sponsor validated?

No, then step 1.2: the sponsor is evicted and the system sends an alarm to all the participants in the network to eliminate the sponsor and the ward, Yes, then step 1.3: optional test concerning the validity of the ward Step 1.4: the ward is not validated, then the system transmits a signal to evict the ward and possibly the sponsor Step 1.5: the ward is validated, then the ward is accepted in the community.

Communication Rules: Definition of SE Behavior Toward the Community

Any SE preferably observes the parameters of the community defined during initialization (the sponsor thus indicates a network and security behavior to the ward: observe key renewals, observe crypto-periods, observe reporting rules, etc.). It preferably also monitors the behavior of the other members of the community with which it communicates and send alarms to the community if there is any suspicion regarding a member of the community. However, denunciation may be perceived as a network attack and the denunciator is open to lockout if its denunciation is unfounded.

In other words, the cryptographic elements that form the system communicate freely within the community. If a cryptographic element finds that another element is not observing the rules of the community then it notifies the others, and it may ask them to exclude it, at the risk of its own exclusion.

Figure 8:
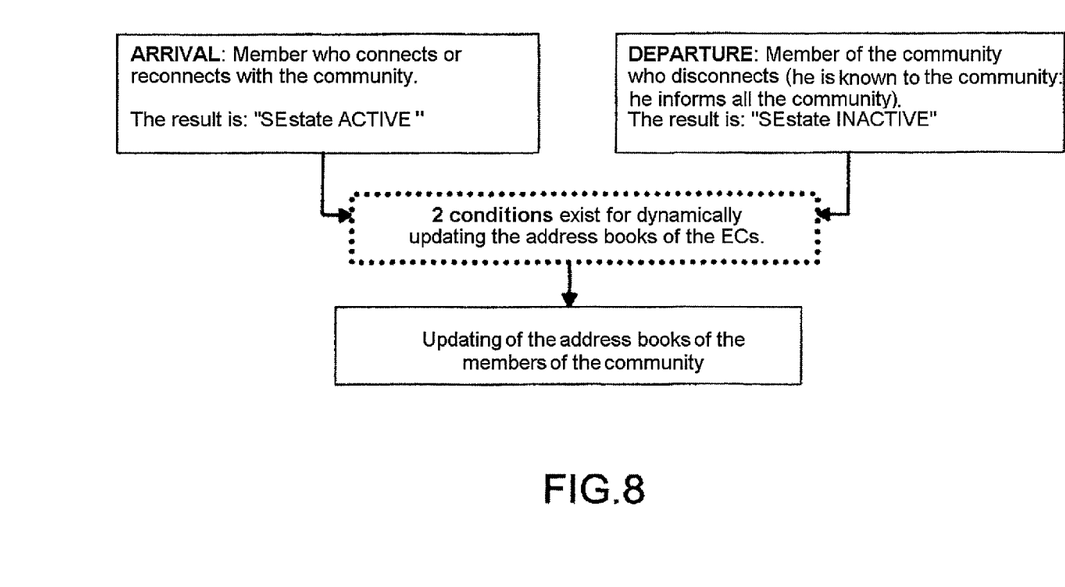

Reporting Rules (Continuation of Communication Rules):

FIG. 8 represents an example of reporting rules implemented by the method according to an embodiment of the invention.

When an element connects to or disconnects from the network, it preferably obeys the following two rules:

if the element has just connected or reconnected to the network, then the state of the cryptographic element is "active", if the element is leaving the network, then the state of the element is "inactive".

Each time, a cryptographic element notifies its community. This may in fact be crucial for the alarm processing case in the event of network access from a new element or a survey.

This "active/inactive" indication is entered in the "address book/community" tables of each element.

General Behavior of the SEs of a Community

The elements of a community are equal to one another, which means that they have the same functionalities:

Election: they can respond to the surveys and to the consultations from newcomers.

Justice: all the SEs can denounce another SE or send a negative vote or send an alarm to the community, initialize and introduce a ward (that is to say, become a sponsor).

Laws: all the SEs can and preferably observes the parameters of the community (denunciation rule, crypto-period, replay prevention counters not observed; etc.).

Exclusion of an SE

The exclusion process is as follows:

Optionally, the SE that has detected the anomaly notifies all or a subset of the members of the community. All the SEs consulted are then mutually notified of their respective recommendations concerning the exclusion decision. Depending on the nature of the messages received and according to an algorithm that is not specific to the invention, the SEs may then decide, by choice:

to exclude the SE that has been denounced to do nothing to exclude the SE that has denounced.

If an SE is excluded, all of the community is then notified of the exclusion. The SEs of the community then remove the excluded member from their address books.

The decentralized management method and system in a network security domain may offer the following advantages: uniform management of the various elements forming the system, non-specific, and simpler management, increased security because all the elements forming the network monitor and check one another, a more readily open-ended network capability than in the case of a network with centralized management.

The method is of interest to multiple applications, in the case of small network topologies. The method according to an embodiment of the invention offers the possibility of managing small network topologies combining both fixed infrastructure elements and mobile units. It is also highly suited to large network topologies since it makes it possible to dispense with a centralized management system which is the source of system vulnerability.

Figure 10:
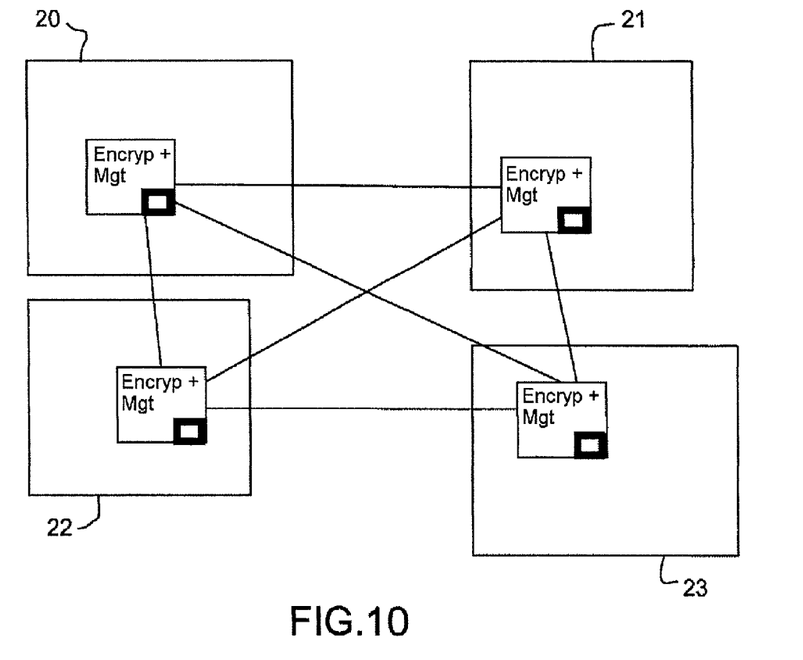

FIG. 10 is an exemplary implementation of an embodiment of the invention for an ad hoc network in which the elements may vary and which is of small size. The encryption elements according to an embodiment of the invention are incorporated, for example, in a first group of foot soldiers 20, a command post 21 is used to manage the maneuvers to be carried out. The system also includes intervention vehicles 23 and a second group of foot soldiers. Each element is equipped with a security entity according to an embodiment of the invention. The various elements communicate with one another and can implement the steps of the method according to an embodiment of the invention detailed hereinabove.

The present invention is not limited to the embodiments described herein, and reference should be had to the appended claims.

The invention claimed is:

1. A decentralized method of managing a plurality of software or hardware security entities positioned to cut off an information stream within a network including the plurality of security entities and in which the plurality of security entities are self-managed for communications with one another, the method comprising propagating trust information relating to information exchanges by performing steps including:

designating, by a microprocessor, an entity out of the plurality of security entities to act as a sponsor for at least one new security entity, requesting to connect the new security entity with the sponsor by way of the new security entity contacting the sponsor and, on receipt of the request to connect the new security entity, the sponsor determining whether or not to accept the connection, when the sponsor accepts the connection of the new security entity, then connecting the sponsor to the new security entity and disconnecting the sponsor from the plurality of entities forming the network, and at least one of the plurality of security entities or the sponsor checking a security level of the new security entity, by performing steps including:

when the sponsor or at least one of the plurality of entities determines the new security entity is trustable, then the sponsor transmits to the configuration information of the new security entity configured to enable the new security entity to enter into communication with at least one of the plurality of security entities of the network, and when the sponsor or at least one of the plurality of entities determines the new security entity is not trustable, then denying the new security entity access to the network and generating an alarm for at least one of the plurality of security entities of the network.

2. The method as claimed in claim 1, wherein the new security entity accesses the network after an initialization step, the access comprising the following steps: when the new security entity is accepted by the plurality of security entities that the new security entity has contacted, address books of the contacted security entities are updated with data of the new security entity, and the new security entity is then free to communicate with the security entities that the new security entity has contacted.

3. The method as claimed in claim 1, wherein each entity of the plurality of entities monitors a behavior of the plurality of entities that are contained in its address book by using predetermined communication rules.

4. The method as claimed in claim 1, wherein a first security entity of the plurality of security entities denounces a second security entity of the plurality of security entities when the first security entity detects an operating anomaly or an abnormal behavior of the second security entity and then notifies other security entities of the network.

5. The method as claimed in claim 4, wherein all the notified security entities are mutually informed of their respective recommendations concerning an exclusion decision and, depending on messages received and according to an algorithm, the notified entities performing at least one of the following:

excluding the second security entity, from all address books of the notified security entities,
taking no action, or
excluding the first security entity from all address books of the notified security entities.

6. A software or hardware security entity configured to cut off information streams within a network, the network comprising a plurality of self-managed entities communicating with one another, the security entity comprising:
   a hardware connection module configured to connect the entity to an element to be protected, the hardware connection module configured to perform an initialization phase including:
      designating an entity to act as a sponsor for at least one new security entity,
      requesting to connect the new security entity with the sponsor based on the new security entity contacting the sponsor and, on receipt of the request to connect the new security entity, the sponsor determining whether or not the sponsor accepts the connection,
      when the sponsor accepts the connection of the new security entity, then connecting the sponsor to the new security entity and disconnecting the sponsor from the plurality of security entities forming the network,
      at least one of the plurality of security entities forming the network or the sponsor checking a security level of the new security entity, by performing steps including:
      when at least one of the sponsor or one of the plurality of entities determines the new security entity is trustable, then the sponsor transmits to the configuration information of the new security entity configured to enable the new security entity to enter into communication with the plurality of entities forming the network, and
      when at least one of the sponsor or one of the plurality of entities forming the network determines the new security entity is not trustable, then denying the new security entity access to the network and sending an alarm to at least one of the plurality of security entities forming the network,
   the hardware connection module being linked to a multiplexer, which receives commands from a control device making it possible to change an operating mode of the element,
   the multiplexer having a first input for protected data originating from the hardware connection module, a second input for data from the hardware connection module used for the initialization phase, a third input receiving the commands, and an output transmitting the data to a trusted platform, and the trusted platform having an output port toward an unprotected network.

7. The software or hardware security entity as claimed in claim 6, wherein the hardware connection module comprises:
   a standard input/output port connected to at least one of a network, a station, and software to be protected, and
   a contact or input port, which enables the initialization phase.

8. The security entity as claimed in claim 7, wherein the hardware connection module includes two software modules, one of the two modules being designed to execute the initialization phase.

9. The security entity as claimed in claim 6, wherein the trusted platform includes at least one of a random variable generation module and a storage module.

10. The security entity as claimed in claim 6, wherein the hardware connection module includes a software module designed to execute the initialization phase for the new security entity and a software module designed to manage inputs and outputs between the entity and a network.

* * * * *